(12) United States Patent
Kelly

(10) Patent No.: US 7,316,447 B2
(45) Date of Patent: Jan. 8, 2008

(54) INTEGRATED MOTOR VEHICLE COWL VENT AND SEAL

(75) Inventor: Walter J. Kelly, Howell, MI (US)

(73) Assignee: GDX North America, Inc., Dover, DE (US)

( * ) Notice: Subject to any disclaimer, the term of this patent is extended or adjusted under 35 U.S.C. 154(b) by 95 days.

(21) Appl. No.: 11/101,851

(22) Filed: Apr. 8, 2005

(65) Prior Publication Data

US 2006/0226681 A1    Oct. 12, 2006

(51) Int. Cl.
B62D 25/08    (2006.01)
(52) U.S. Cl. ..................... 296/192; 454/146
(58) Field of Classification Search ............... 296/192, 296/191; 454/146
See application file for complete search history.

(56) References Cited

U.S. PATENT DOCUMENTS

| 4,285,540 | A | 8/1981 | Harada et al. |
|---|---|---|---|
| 4,930,790 | A | 6/1990 | Sheridan |
| 4,962,961 | A | 10/1990 | Ito et al. |
| 5,108,146 | A | 4/1992 | Sheppard |
| 6,623,688 | B2 | 9/2003 | Gedritis et al. |
| 6,830,288 | B2 | 12/2004 | Eynon et al. |
| 2003/0107243 | A1* | 6/2003 | Hayashi ............... 296/192 |
| 2003/0205915 | A1 | 11/2003 | Gedritis et al. |
| 2004/0124669 | A1 | 7/2004 | Eynon et al. |
| 2006/0202516 | A1* | 9/2006 | Mori ................... 296/192 |

FOREIGN PATENT DOCUMENTS

| JP | 9-132089 | 5/1997 |
|---|---|---|
| JP | 10-218029 | 8/1998 |

* cited by examiner

*Primary Examiner*—Joseph D Pape
(74) *Attorney, Agent, or Firm*—Brinks Hofer Gilson & Lione

(57) ABSTRACT

An integrated windshield cowl and seal assembly includes a body of a rigid thermoplastic material and upper and lower forward and lower rear resilient seals bonded to the body. The seals may be either bonded by material compatibility or by mechanical, interlocking or other mechanisms. The cowl assembly according to the present invention significantly reduces the number of parts when compared to prior art assemblies. The cowl and seal assembly may also include fender closeouts which extend to the adjacent inner surfaces of the fenders and seal thereagainst.

11 Claims, 4 Drawing Sheets

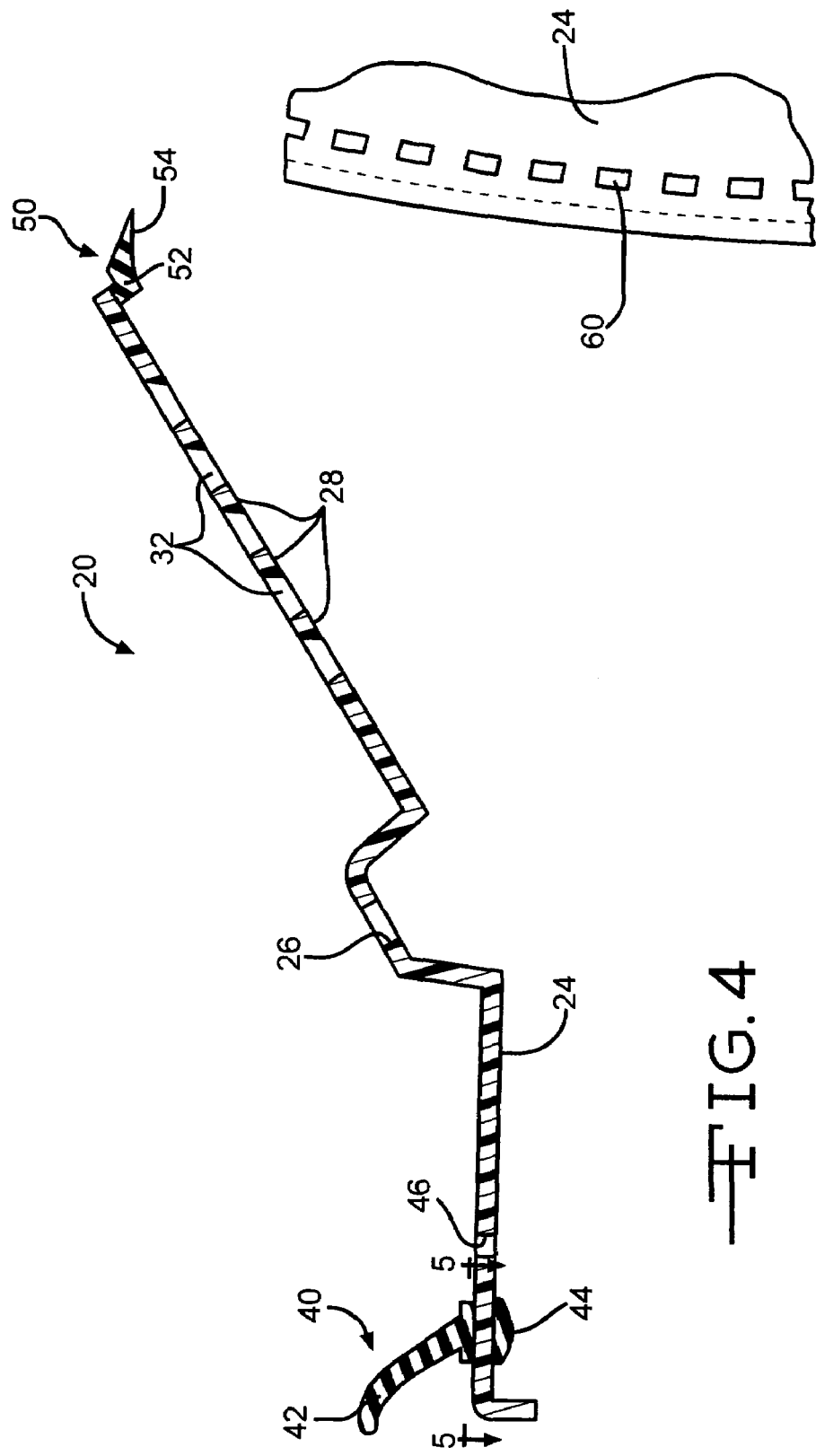

INTEGRATED MOTOR VEHICLE COWL VENT AND SEAL

BACKGROUND OF THE INVENTION

The invention relates generally to cowls for motor vehicles and more specifically to an integrated cowl for a motor vehicle having a rigid body and upper, lower and rear resilient integrated seals.

Motor vehicle, i.e., passenger car, pickup truck and SUV, designers have settled upon drawing air for heating, cooling and ventilating the passenger compartment of the motor vehicle through the gap between the rear of the hood and the windshield. This region also houses and accommodates the windshield wipers and often washer jets. As such, the cowl must perform several functions: allow the ingress of fresh air, exclude debris and foreign objects such as leaves and twigs; cosmetically and aesthetically close or fill the gap between the windshield and hood; accept components of the windshield wiper and washer system and facilitate the off flow of water from the windshield.

For many years, the cowl was metal and was generally horizontal and stationary, the hood aligning with the cowl when it was closed. Now, the cowl is generally plastic and may comprise numerous small pieces which are either assembled on the vehicle or are assembled into a complete cowl structure prior to installation. For example, separate left, center and right sections may include inserts for receiving windshield washer and wiper components as well as flexible seals.

One of the design criteria which complicates the cowl is the necessity of providing a tight seal both against the windshield or windshield support structure at the rear of the cowl and also to the hood and adjacent structure at the front of the cowl in order to foreclose the ingress of foreign matter.

From the foregoing, it is apparent that improvements in the art and design of motor vehicle cowls would be desirable.

SUMMARY OF THE INVENTION

An integrated windshield cowl and seal assembly includes a body portion of a rigid thermoplastic material and upper and lower forward and lower rearward resilient seals bonded to the body portion. The seals may be either bonded by material compatibility or by mechanical, interlocking means. The cowl and seal assembly according to the present invention significantly reduces the number of parts when compared to prior art assemblies. The cowl and seal assembly may also include fender closeouts which extend to the adjacent inner surfaces of the fenders and seal thereagainst.

It is thus an object of the present invention to provide an integrated motor vehicle cowl and seal assembly.

It is a further object of the present invention to provide an integrated motor vehicle cowl and seal assembly wherein the cowl and seals are fabricated of distinct materials.

It is a still further object of the present invention to provide an integrated motor vehicle cowl and seal wherein the materials of the cowl and seals are secured together.

It is a still further object of the present invention to provide an integrated motor vehicle cowl and seal assembly including optional fender closeouts.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 4 is an enlarged, full, sectional view of an integrated cowl and seal assembly according to the present invention; and FIG. 5 is a fragmentary, sectional view of an integrated cowl and seal assembly according to the present invention taken along line 5-5 of FIG. 4.

DETAILED DESCRIPTION OF THE INVENTION

Figure 1:
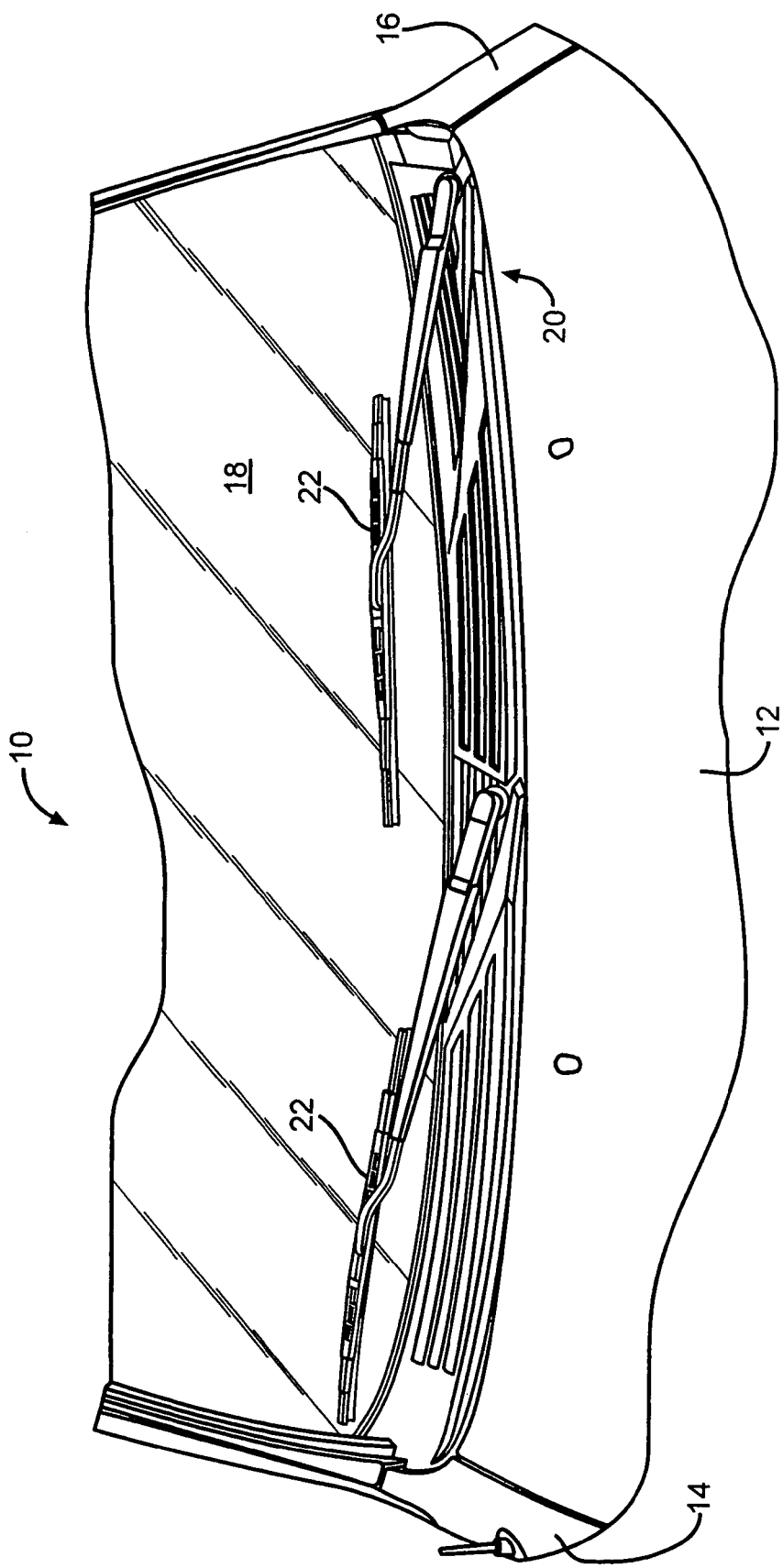
FIG. 1 is a front view of a portion of a motor vehicle illustrating an integrated cowl and seal assembly according to the present invention.

Referring now to FIG. 1, a forward portion of a motor vehicle is illustrated and generally designated by the reference number 10. The motor vehicle 10 includes a hood 12 which pivotally and selectively covers and closes an engine compartment (not illustrated), a right fender assembly 14, a left fender assembly 16 and a windshield 18.

Extending transversely across the motor vehicle 10 between the hood 12 and the windshield 18 is an integrated cowl assembly 20. In typical fashion, a pair of windshield wipers 22 are mounted upon and driven by shafts (not illustrated) extending through the cowl assembly 20. The integrated cowl assembly 20 extends from the rear, underside of the hood 12 to the front of the windshield 18 and transversely, generally from the right fender 14 to the left fender 16.

Figure 2:
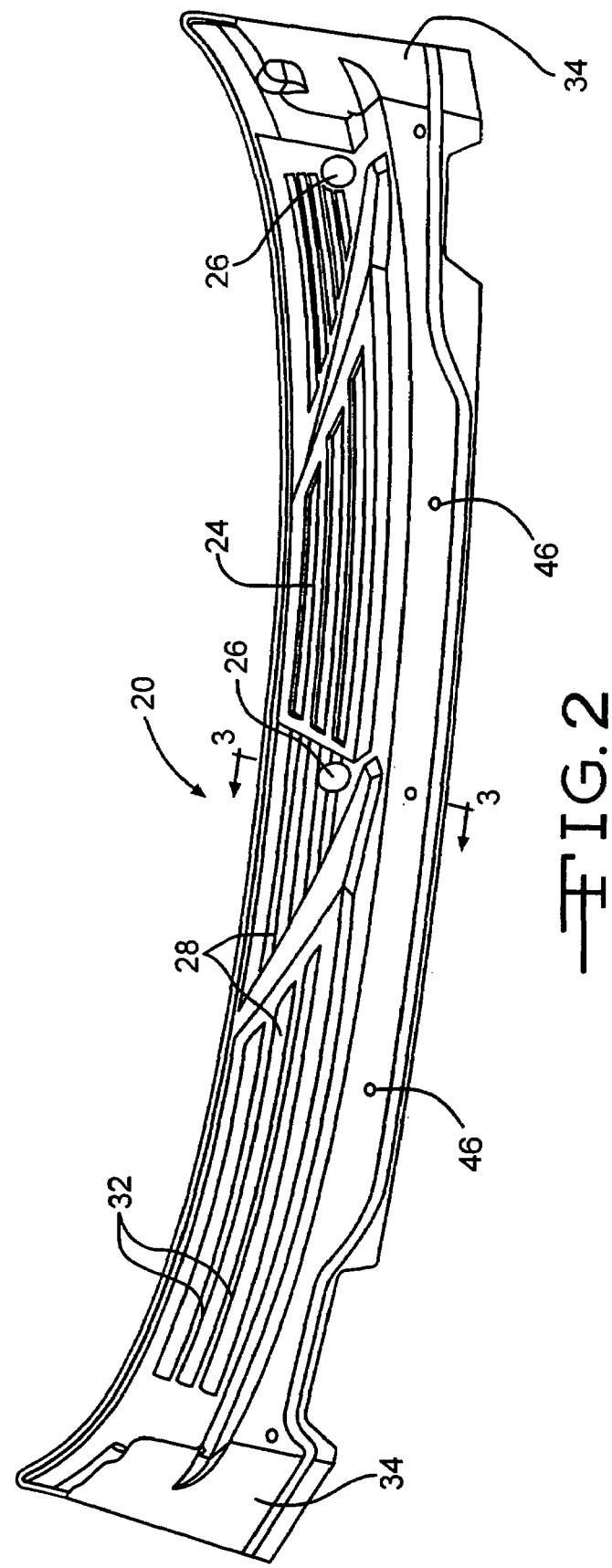
FIG. 2 is a plan view of an integrated motor vehicle cowl and seal assembly according to the present invention including fender closeouts.

Turning now to FIG. 2, the integrated cowl assembly 20 includes an elongate cowl structure or body 24 having suitably sized and disposed openings 26 for receiving windshield wiper drive shafts (not illustrated). The cowl body 24 also includes a plurality of variously configured transverse and longitudinal ridges, channels and troughs 28, which define a plurality of through openings 32, which facilitate the ingress of fresh air into the heating, ventilating and air conditioning system (not illustrated) of the motor vehicle 10.

Depending upon both the configuration of the motor vehicle 10 and the integrated cowl assembly 20, the cowl assembly 20 may include left and right fender closeouts 34. The left and right fender closeouts 34 are small end features of the integrated cowl assembly 20, which may be either integrally formed therewith or separately fabricated and subsequently attached by known mounting and securing techniques such as autogenous bonding including RF or heat sealing or other methods such as the use of adhesives. The fender closeouts 34 close off or seal any open regions at the ends of the cowl body 24 adjacent the fenders 14 and 16 through which foreign matter, rodents or other undesirable material or substances might otherwise gain access to the vehicle ventilating, heating and air conditioning system.

The cowl body 24 and the finder closeouts 34 are preferably fabricated of a rigid thermoplastic material such as acrylonitrile butadiene styrene (ABS), an acrylonitrile butadiene styrene/polycarbonate blend, a thermoplastic olefin (TPO) or other, similar thermoplastic materials. The term "rigid" as used herein means reasonably inflexible, reasonably resistance to impact and capable of supporting itself over the region (several feet by several inches) it extends.

Figure 3:
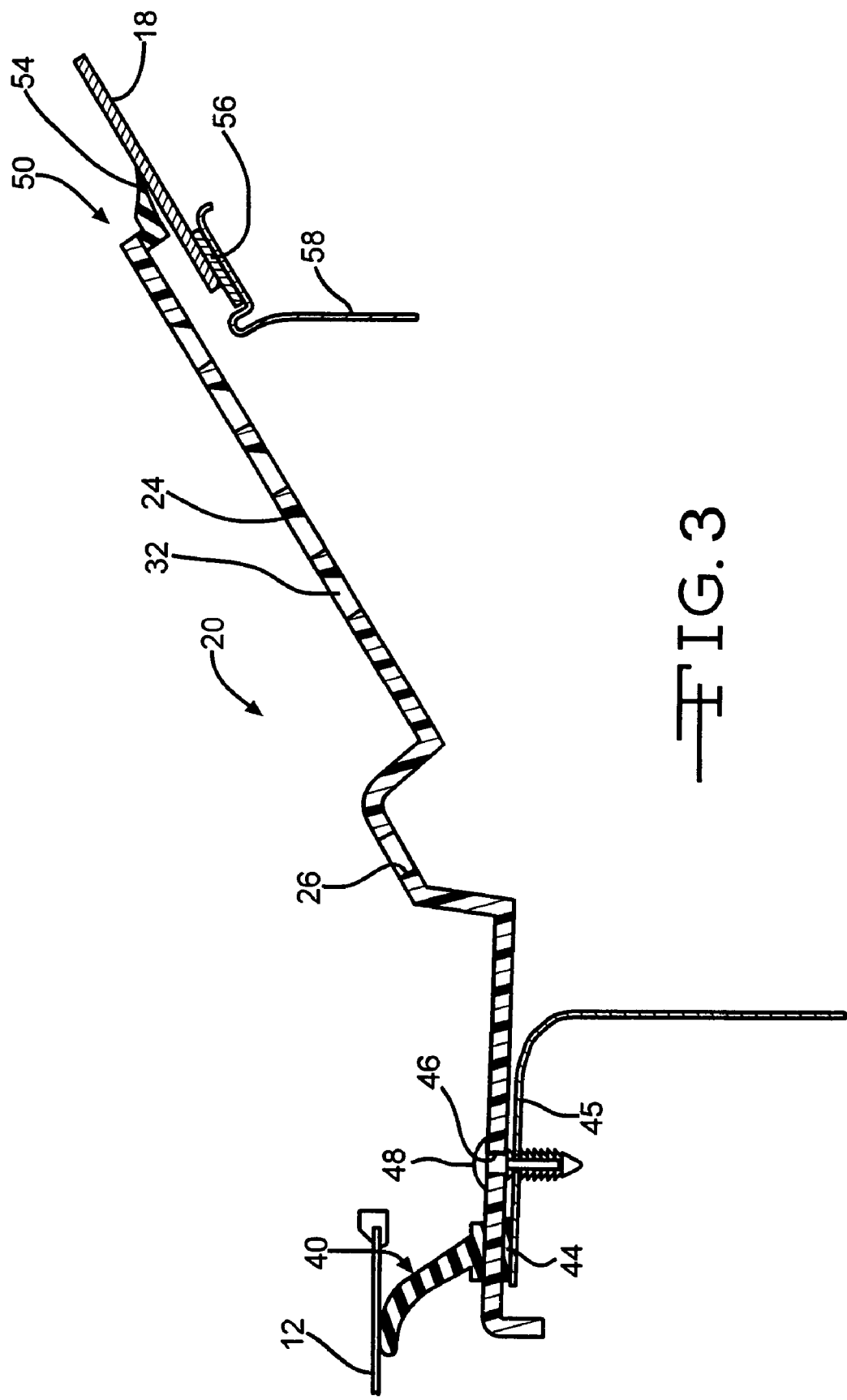
FIG. 3 is a full, sectional view of an integrated cowl and seal assembly taken along line 3-3 of FIG. 2.

Referring now to FIGS. 3 and 4, the integrated cowl assembly 20 includes a first or forward flexible flange or seal 40 which is mechanically secured to the forward portion of the cowl body 24, extends obliquely therefrom and engages the underside of the hood 12 to prevent the ingress of foreign objects and material, into the engine compartment of the motor vehicle 10. The first or forward flange or seal 40 also includes a lower seal 44 depending from the cowl body 24, which engages a metal flange, plate or member 45 disposed proximate the engine compartment of the motor vehicle 10. Preferably, the cowl body 24 includes a plurality of small through openings 46 which receive threaded fasteners, Christmas tree (push-in) fasteners or similar removable fasteners 48 which secure the forward edge of the cowl body 24 to the metal member 45 of the motor vehicle 10. Depending upon the configuration of the motor vehicle 10, other securement means such as clips, adhesives, clamps, cowl receiving slots or magnets may be utilized to secure the cowl body 24 to the metal flange or member 45.

At the rear, lower edge of the cowl 24 is disposed a second or rear seal assembly 50. The second or rear seal assembly 50 includes a body 52 narrowing to a flexible lip or flange 54 which engages the windshield 18 adjacent its lower gasket or seal 56, which supports the windshield 18 on a transverse metal body member 58. Both the front seal assembly 40 and the rear seal assembly 50 may be fabricated of a soft, flexible elastomer such as rubber, synthetic rubber, or a similar material.

Preferably, the cowl assembly 20 is produced by sequential injection of a thermoplastic material to form the cowl body 24 and a compatible material to form the seal assemblies 40 and 50 such as a polypropylene filled thermoplastic elastomer (TPE), a thermoplastic olefin (TPO), a thermoplastic vulcanizate (TPV) or a combination thereof. Alternatively, the seal assemblies 40 and 50 can be fabricated of a non-compatible material (with the cowl body 24) and thus may be mechanically bonded (as shown) or secured with a suitable adhesive.

Referring now to FIGS. 4 and 5, the first or forward seal assembly 40 is molded and preferably mechanically interlocked to the cowl body 24 by virtue of a plurality of spaced apart through apertures 60 formed therein adjacent the forward or leading edge of the cowl body 24. The first or forward flange assembly 40 is thus preferably in-situ molded upon the cowl body 24 of the cowl assembly 20 and thus is retained thereon by the continuous upper flange 42, the continuous lower flange 44 and the plurality of webs or sections extending through the plurality of apertures 60.

While this invention has been described in terms of certain embodiments thereof, it is not intended to be so limited, but rather should be limited only to the extent set forth in the claims that follow.

The invention claimed is:

1. An integrated cowl assembly for a motor vehicle comprising, in combination,
    a rigid elongate body adapted for transverse disposition on a motor vehicle, said body defining at least one opening for a windshield washer component, and a plurality of ventilation openings,
    a first seal assembly secured to a forward portion of said body and including an upper flexible flange and a lower sealing member, and
    a second seal assembly secured to a rearward portion of said body and including a lower flexible flange, wherein said first and second seal assemblies are fabricated of an elastomeric material.

2. The integrated cowl assembly of claim 1, wherein said body is fabricated of a thermoplastic material.

3. The integrated cowl assembly of claim 1, further including a pair of fender closeouts secured to said elongate body.

4. The integrated cowl assembly of claim 1, wherein said upper sealing flange is adapted to engage the underside of a vehicle hood.

5. The integrated cowl assembly of claim 1, wherein said second seal assembly is adapted to engage a windshield of a vehicle.

6. The integrated cowl assembly of claim 1, wherein said elongate body includes a plurality of openings for receiving fasteners.

7. An integrated cowl assembly for a motor vehicle comprising, in combination,
    a body adapted for transverse disposition on a motor vehicle, said body defining at least one opening for a windshield washer component and a plurality of openings along and adjacent a forward portion of said body,
    a first seal assembly mechanically secured to said openings in said body and including an upper sealing flange and a lower sealing member, and
    a second seal assembly secured to a rearward portion of said body and including a lower sealing flange, wherein said first and second seal assemblies are fabricated of a flexible material.

8. The integrated cowl assembly of claim 7, wherein said body is fabricated of a rigid material.

9. The integrated cowl assembly of claim 7, further including a pair of fender closeouts secured to said body.

10. The integrated cowl assembly of claim 7, wherein said upper sealing flange is adapted to engage the underside of a vehicle hood.

11. The integrated cowl assembly of claim 7, wherein said body includes a plurality of openings for receiving fasteners.

* * * * *